US011983125B2

(12) United States Patent
Soni et al.

(10) Patent No.: US 11,983,125 B2
(45) Date of Patent: May 14, 2024

(54) DATA TRAFFIC PRIORITIZATION BASED ON CONTENT

(71) Applicant: International Business Machines Corporation, Armonk, NY (US)

(72) Inventors: Bharti Soni, Pune (IN); Komal Shailendra Shah, Pune (IN); Tej Parkash, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 17/388,182

(22) Filed: Jul. 29, 2021

(65) Prior Publication Data
US 2023/0032090 A1    Feb. 2, 2023

(51) Int. Cl.
*G06F 13/20* (2006.01)
*G06F 9/445* (2018.01)
*G06F 15/173* (2006.01)

(52) U.S. Cl.
CPC .......... *G06F 13/20* (2013.01); *G06F 9/44505* (2013.01); *G06F 15/17331* (2013.01); *G06F 2213/0036* (2013.01)

(58) Field of Classification Search
None
See application file for complete search history.

(56) References Cited

U.S. PATENT DOCUMENTS

| | | | | |
|---|---|---|---|---|
| 7,516,487 | B1* | 4/2009 | Szeto | H04L 63/0263 726/13 |
| 8,533,823 | B2* | 9/2013 | Szeto | H04L 63/0263 726/22 |
| 9,276,966 | B2* | 3/2016 | Tenenti | H04L 65/1063 |
| 9,396,450 | B2* | 7/2016 | Gazdzinski | G04G 21/04 |
| 9,973,446 | B2* | 5/2018 | Cohen | H04L 49/351 |
| 10,404,792 | B2 | 9/2019 | Fountain et al. | |
| 11,416,431 | B2* | 8/2022 | Malladi | G06F 12/0802 |
| 11,431,561 | B2* | 8/2022 | Smith | G06F 16/1824 |
| 2004/0010612 | A1* | 1/2004 | Pandya | H04L 9/40 709/213 |
| 2006/0036448 | A1* | 2/2006 | Haynie | G06Q 10/10 705/37 |
| 2009/0260083 | A1* | 10/2009 | Szeto | H04L 63/101 726/22 |

(Continued)

OTHER PUBLICATIONS

Mell et al., "The NIST Definition of Cloud Computing", Recommendations of the National Institute of Standards and Technology, Sep. 2011, 7 pages.

*Primary Examiner* — Henry Tsai
*Assistant Examiner* — Christopher A Bartels
(74) *Attorney, Agent, or Firm* — Stosch Sabo

(57) ABSTRACT

Described are techniques including a computer-implemented method that comprises defining a respective priority classification for each of a plurality of sockets used for communicating between an initiator computational system and a target computational system. The method further comprises automatically assigning a respective priority classification to each of a plurality of Input/Output (IO) requests based on a type of data associated with each IO request. The method further comprises sending the plurality of IO requests to respective sockets of the plurality of sockets with a matching priority classification.

20 Claims, 8 Drawing Sheets

(56) References Cited

U.S. PATENT DOCUMENTS

| | | | |
|---|---|---|---|
| 2013/0138836 A1* | 5/2013 | Cohen | H04L 49/351 |
| | | | 709/250 |
| 2014/0341027 A1* | 11/2014 | Chen | H04L 43/0829 |
| | | | 370/232 |
| 2019/0044864 A1 | 2/2019 | Muntz et al. | |
| 2019/0166062 A1 | 5/2019 | Verbree et al. | |
| 2020/0042350 A1* | 2/2020 | Deval | G06F 9/45558 |
| 2020/0328912 A1* | 10/2020 | Hou | H04L 41/12 |
| 2021/0075643 A1 | 3/2021 | Choquette et al. | |
| 2021/0119930 A1* | 4/2021 | Debbage | H04L 1/1642 |
| 2021/0311646 A1* | 10/2021 | Malladi | G06F 3/0619 |
| 2021/0311871 A1* | 10/2021 | Malladi | G06F 13/4027 |
| 2021/0311900 A1* | 10/2021 | Malladi | G06F 13/4027 |
| 2022/0210225 A1* | 6/2022 | Shilimkar | H04L 47/2408 |
| 2023/0110131 A1* | 4/2023 | Smith | H04L 69/22 |
| | | | 370/254 |
| 2023/0344532 A1* | 10/2023 | Kakaire | H04B 17/318 |

* cited by examiner

DATA TRAFFIC PRIORITIZATION BASED ON CONTENT

BACKGROUND

The present disclosure relates to data traffic management in computational systems, and, more specifically, to prioritizing data traffic based on data content.

Network congestion in computational systems refers to reduced quality of service (QoS) that occurs when a connection between two or more computational systems transmits data in excess volume or rate than the connection is designed to transmit. Disadvantageously, network congestion can lead to communication delays, packet loss, and/or blocking of new connections. Furthermore, some data communication protocols exacerbate congestion in over-utilized connections. As one example, some network protocols implement retransmissions of data to compensate for lost packets. However, retransmissions can increase congestion and lead to more lost packets, thereby triggering further retransmissions.

SUMMARY

Aspects of the present disclosure are directed toward a computer-implemented method that comprises defining a respective priority classification for each of a plurality of sockets used for communicating between an initiator computational system and a target computational system. The method further comprises automatically assigning a respective priority classification to each of a plurality of Input/Output (IO) requests based on a type of data associated with each IO request. The method further comprises sending the plurality of IO requests to respective sockets of the plurality of sockets with a matching priority classification.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
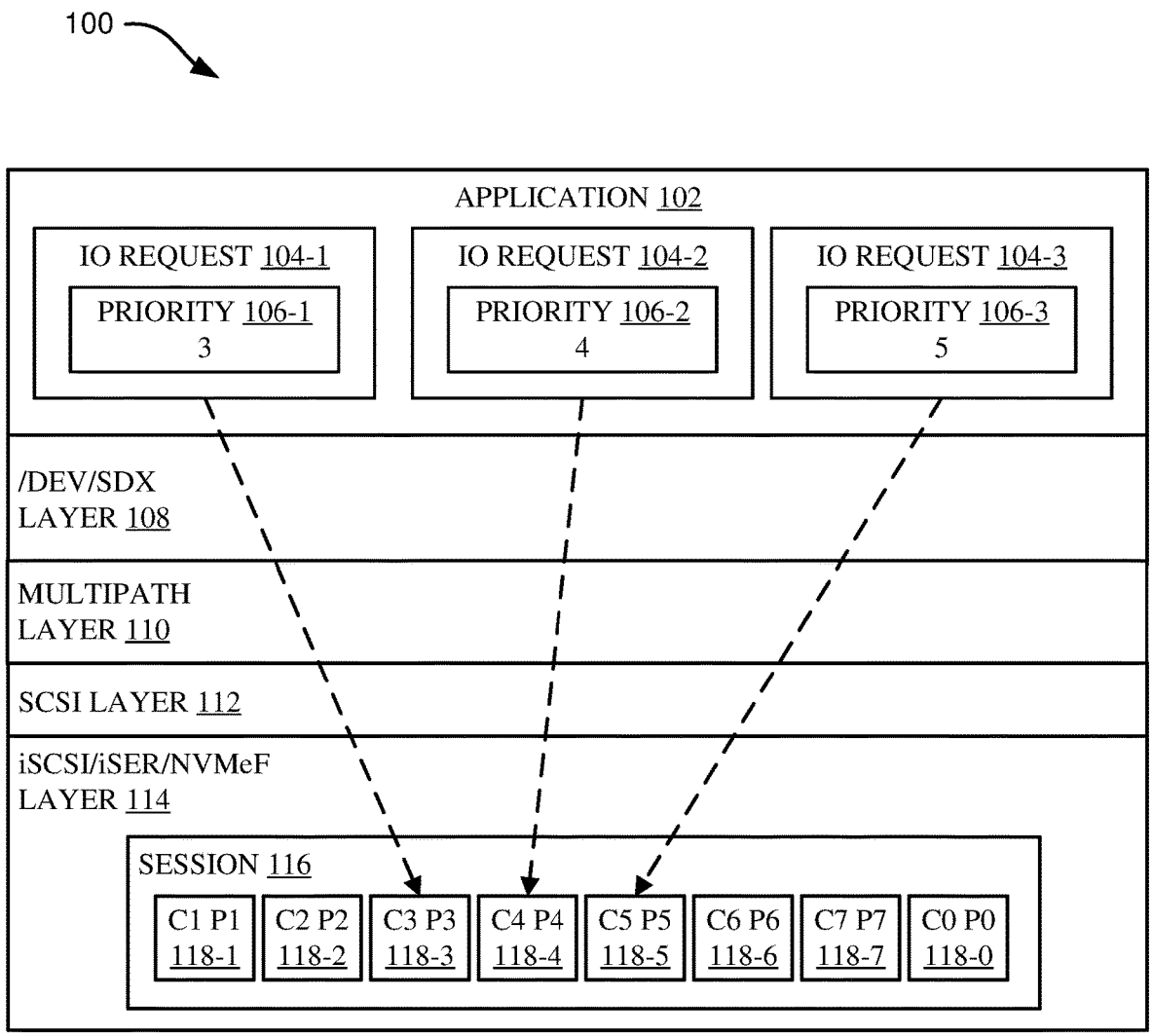
FIG. 1 illustrates a block diagram of an example computational environment where an application implements dynamic data prioritization using various session sockets, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data traffic management in computational systems, and, more specifically, to prioritizing data traffic based on data content. While not limited to such applications, embodiments of the present disclosure may be better understood in light of the aforementioned context.

As networking speeds have increased, networking ports can now support protocols like Internet Small Computer Systems Interface (iSCSI), iSCSI Extensions for RDMA (iSER), and Non-Volatile Memory Express over Fabric (NVMeF). The increase in data volume together with the variety of networking protocols can lead to increased traffic congestion. Thus, intelligently prioritizing traffic has become increasingly important for maintaining performance in interconnected computational systems.

Priority Flow Control (PFC) is a mechanism to selectively pause traffic on an Ethernet Fabric based on various classes of service (e.g., iSCSI, iSER, NVMeF, etc.) of Ethernet Frames. The PFC capability was introduced as an Institute of Electrical and Electronics Engineers (IEEE) standard 802.1Qbb. The Priority Code Point (PCP, also referred to as a priority value) in PFC can range from 0 to 7, where priority 7 refers to the highest priority. In data center applications, different traffic classes (or class of services) can be iSCSI, Fibre Channel over Ethernet (FCoE), iSER, NVMeF, and the like. However, the IEEE standard 802.1Qbb applies a same priority value (e.g., PCP value) in all outgoing packets for each given traffic class, thus there is no meaningful differentiation in packet priorities. Nonetheless, data center environments run various applications that have differentiated priorities. Example applications that can operate in a data center environment include: (i) applications serving host Input/Output (IO) requests, (ii) applications doing backend IO operations. (iii) applications doing data replication/backup, (iv) applications doing cluster operations, and/or (v) other applications. Considering (i) as an example (applications serving host IO requests), there can be multiple hosts doing IO operations on the same target port. These hosts can run different types of server applications, each having different data transfer requirements. For example, some hosts may run a banking application that includes transferring confidential data while other hosts may run an application involving video file transfers or text file transfers. Furthermore, in addition to different data priorities between different hosts, some hosts can also send different types of data (with different priorities) at different points in time. Accordingly, within a single connection some packets can be of higher priority whereas other packets can be of lower priority. Nonetheless, if a priority pause for a given traffic class is received at a given host, then all data transfer will be impacted regardless of priority. This includes any host that is doing critical IO operations. Hence having a same priority (e.g., an undefined priority, a default priority, etc.) for all data transfers for all host applications is not desirable and can, in fact, be detrimental to performance.

One workaround for overcoming the issue of default priorities for all data transfers from all hosts is to manually change a socket priority of any host sockets that are performing critical IO operations. These manually modified socket priorities can then be mapped to a high priority network value. However, this workaround does solve the problem where a single host generates some data packets that are of relatively higher priority and some data packets that are of relatively lower priority. Furthermore, manually changing socket priorities for multiple hosts is time consuming, not scalable, and prone to error.

Aspects of the present disclosure overcome the aforementioned challenges and drawbacks. For example, some embodiments of the present disclosure can use different priority code point (PCP) values for different packets within a single endpoint based on data content. In some embodiments, a data type (and/or content) of a data packet is analyzed, a priority is assigned to the data packet based on the data type (and/or content), and the data packet is then sent with the assigned priority. In some embodiments, data packets are transmitted using a specific socket with a matching priority as the data packet.

As a result, aspects of the present disclosure can realize numerous advantages. First, network traffic can be prioritized based on priority of data packets rather than being based on traffic classes. Second, aspects of the present disclosure can be transferrable between a variety of network traffic management applications such as, but not limited to, host attached traffic, storage traffic, replication traffic, and system management traffic. Further, aspects of the present disclosure can be applicable to different traffic classes (e.g., iSCSI, iSER, NVMeF, etc.). Further still, aspects of the present disclosure can enable different data packet priorities to be assigned to different hosts (inter-host) and to different data packets within a same host (intra-host). Third, aspects of the present disclosure can result in the data of relatively higher importance being less susceptible to network traffic congestion. Thus, even for storage systems having insufficient bandwidth, aspects of the present disclosure can nonetheless preferentially prioritize data packets with higher priority over data packets with lower priority. The aforementioned advantages are example advantages and are not limiting. Further, embodiments of the present disclosure can exist which realize all, some, or none of the aforementioned example advantages while still remaining within the spirit and scope of the present disclosure.

Referring now to the figures, FIG. 1 illustrates a block diagram of an example computational environment 100 where an application 102 implements dynamic data prioritization using various session sockets, in accordance with some embodiments of the present disclosure.

Application 102 can be any software implemented by a computational system such as, but not limited to, a desktop, a laptop, a tablet, a smartphone, a server, and/or another configuration of hardware (whether tangible or virtualized) and/or software useful for implementing an application 102.

In some embodiments, for example, application 102 can perform backup, replication, and/or disaster recovery (DR) operations, where application 102 can transmit data for backup or restoration purposes with a DR endpoint using dynamic data prioritization using various sessions sockets.

The application 102 can include a plurality of IO requests 104 such as a first IO request 104-1, a second IO request 104-2, and a third IO request 104-3. IO requests 104 can encompass any communicated data between two endpoints. Thus, IO requests 104 can also encompass system calls, SCSI commands, and the like.

Each of the plurality of IO requests 104 can be associated with a respective priority 106 such as a first priority 106-1 of value 3 (associated with the first IO request 104-1), a second priority 106-2 of value 4 (associated with the second io request 104-2), and a third priority 106-3 of value 5 (associated with the third IO request 104-3). The priorities shown in FIG. 1 are example priorities and other types of numeric, alphabetical, alphanumeric, or symbolic priorities can be used.

The plurality of IO requests 104 and their associated priorities 106 can be communicated to an iSCSI/iSER/NVMeF layer 114 through one or more intervening layers such as, for example, a /dev/sdx layer 108, a multipath layer 110, and a SCSI layer 112. The /dev/sdx layer 108 can refer to a portion of a directory tree (e.g., in Unix) that contains device files (e.g., /dev/) and, more specifically, a specific attached or embedded storage device (e.g., a storage device labeled "x"). In other words, the /dev/sdx layer 108 can be a first layer to manage communications between the application 102 and the underlying hardware implementing the application 102.

The multipath layer 110 can refer to multiple physical paths between processing resources and storage resources (e.g., using buses, controllers, switches, etc.) in hardware implementing the application 102. In other words, the multipath layer 110 can realize a fault-tolerant, performance-enhancing networking layer for enabling application 102 to successfully communicate with the underlying hardware implementing the application 102.

The SCSI layer 112 can refer to a set of standardized commands, protocols, electrical interfaces, optical interfaces, and/or logical interfaces for physically connecting and transferring data between computational systems and/or peripheral devices.

The iSCSI/iSER/NVMeF layer 114 can refer to an iSCSI layer, an iSER layer, or an NVMeF layer. In the case of an iSCSI layer, the iSCSI/iSER/NVMeF layer 114 can represent a standardized methodology for carrying SCSI commands over a Transmission Control Protocol/Internet Protocol (TCP/IP) network for the purpose of linking two or more computational systems. In the case of an iSER layer, the iSCSI/iSER/NVMeF layer 114 can represent the functionality of an iSCSI layer with the additional functionality of enabling Remote Direct Memory Access (RDMA). The additional RDMA functionality enables an iSER layer to directly transfer data into and out of SCSI computer memory buffers without intermediate data copies and with relatively little intervention by processing resources. The additional RDMA functionality can be realized in an iSER layer by utilizing a TCP and/or User Datagram Protocol (UDP) with RDMA service that uses one or more of Ethernet, RDMA over Converged Ethernet (RoCE), iWARP, and/or Infiniband (IB). In the case of an NVMeF layer, the iSCSI/iSER/NVMeF layer 114 can represent an NVMeF over Ethernet layer, an NVMeF over TCP layer, or an NVMeF over RDMA layer, for example.

The iSCSI/iSER/NVMeF layer 114 can host a session 116 made up of a plurality of sockets 118, where each of the plurality of sockets 118 is for a dedicated priority 106. For example, session 116 can host a socket C1 P1 118-1 (for IO requests classified as priority 1), a socket C2 P2 118-2 (for IO requests classified as priority 2), a socket C3 P3 118-3 (for IO requests classified as priority 3), a socket C4 P4 118-4 (for IO requests classified as priority 4), a socket C5 P5 118-5 (for IO requests classified as priority 5), a socket C6 P6 118-6 (for IO requests classified as priority 6), a socket C7 P7 118-7 (for IO requests classified as priority 7), and a socket C0 P0 118-0 (for IO requests classified as priority 0 or a default priority). Although eight sockets 118 are shown, more or fewer sockets with similar priorities, different priorities, or combinations of priorities (e.g., sets of priorities, ranges of priorities, etc.) can exist in other embodiments.

As shown in FIG. 1, the IO requests 104 are directed to respective sockets 118 corresponding to the priority 106 associated with each of the IO requests 104—thereby enabling different priorities to be assigned to different data packets generated by a single application 102. In some embodiments, the priorities 106 are automatically assigned to the IO requests 104 based on characteristics of the IO requests 104. For example, priorities 106 can be assigned based on a type of data in (or otherwise associated with) IO requests 104, a type of IO request 104, and/or other characteristics of the IO requests 104.

Figure 2:
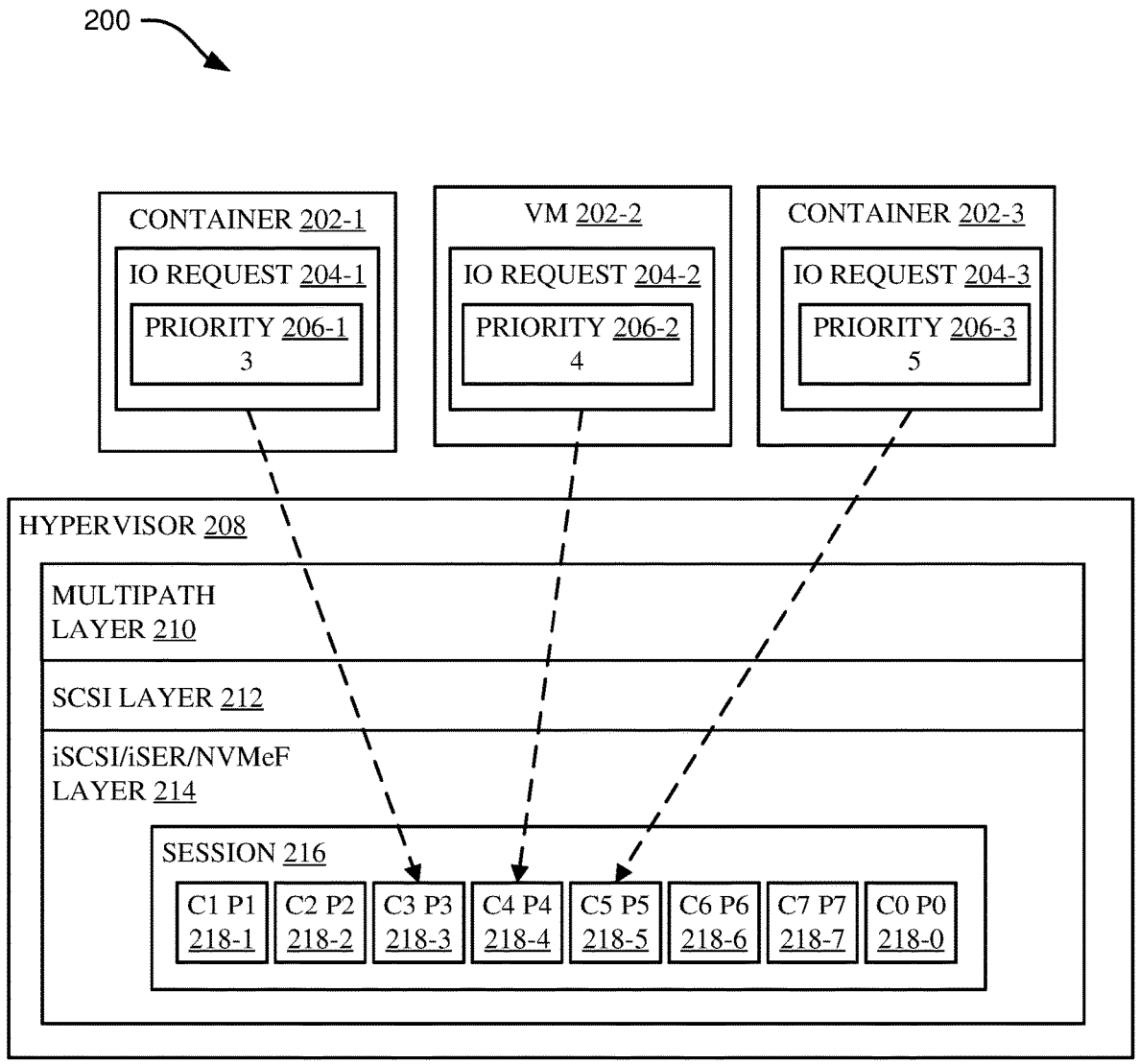
FIG. 2 illustrates a block diagram of an example computational environment where containers and/or virtual machines implement dynamic data prioritization using various session sockets, in accordance with some embodiments of the present disclosure.

FIG. 2 illustrates a block diagram of another example computational environment 200 where containers and/or virtual machines (VMs) implement dynamic data prioritization using various session sockets, in accordance with some embodiments of the present disclosure. The example computational environment 200 can include a plurality of containers and/or VMs such as a first container 202-1, a first VM 202-2, and a second container 202-3. In other embodiments, there may be a plurality of containers, a plurality of VMs, or a combination of both VMs and containers. Each of the containers or VMs includes an IO request such as first IO request 204-1 (associated with first container 202-1), second IO request 204-2 (associated with first VM 202-2), and third IO request 204-3 (associated with second container 202-3). Each of the IO requests 204 is associated with a respective priority 206 such as a first priority 206-1 of value 3 (associated with the first IO request 204-1), a second priority 206-2 of value 4 (associated with the second IO request 204-2), and a third priority 206-3 of value 5 (associated with the third IO request 204-3). The priorities shown in FIG. 2 are example priorities and other types of numeric, alphabetical, alphanumeric, or symbolic priorities can be used.

Each of the IO requests 204 can be routed to an appropriate socket 218 corresponding to the priority 206 of each IO request 204. Sending the IO requests 204 to the sockets 218 can involve transmitting the IO requests 204 through multiple layers that can be at least partially managed by a hypervisor 208 such as a multipath layer 210, a SCSI layer 212, and an iSCSI/iSER/NVMeF layer 214. The multipath layer 210 can be consistent with multipath layer 110 of FIG. 1, the SCSI layer 212 can be consistent with SCSI layer 112 of FIG. 1, and the iSCSI/iSER/NVMeF layer 214 can be consistent with the iSCSI/iSER/NVMeF layer 114 of FIG. 1.

The iSCSI/iSER/NVMeF layer 214 can instantiate a session 216 including a plurality of sockets 218. For example, session 216 can host a socket C1 P1 218-1 (for IO requests classified as priority 1), a socket C2 P2 218-2 (for IO requests classified as priority 2), a socket C3 P3 218-3 (for IO requests classified as priority 3), a socket C4 P4 218-4 (for IO requests classified as priority 4), a socket C5 P5 218-5 (for IO requests classified as priority 5), a socket C6 P6 218-6 (for IO requests classified as priority 6), a socket C7 P7 218-7 (for IO requests classified as priority 7), and a socket C0 P0 218-0 (for IO requests classified as priority 0 or a default priority). Although eight sockets 218 are shown, more or fewer sockets with similar priorities, different priorities, or combinations of priorities (e.g., sets of priorities, ranges of priorities, etc.) can exist in other embodiments.

As shown in FIG. 2, the IO requests 204 are directed to respective sockets 218 corresponding to the priority 206 associated with each of the IO requests 204—thereby enabling different priorities to be assigned to different data packets generated by a single application 102. In some embodiments, the priorities 206 are automatically assigned to the IO requests 204 based on characteristics of the IO requests. For example, priorities 206 can be assigned based on a type of data in IO requests 204, a type of IO request 204, and/or other characteristics of the IO requests 204.

Figure 3:
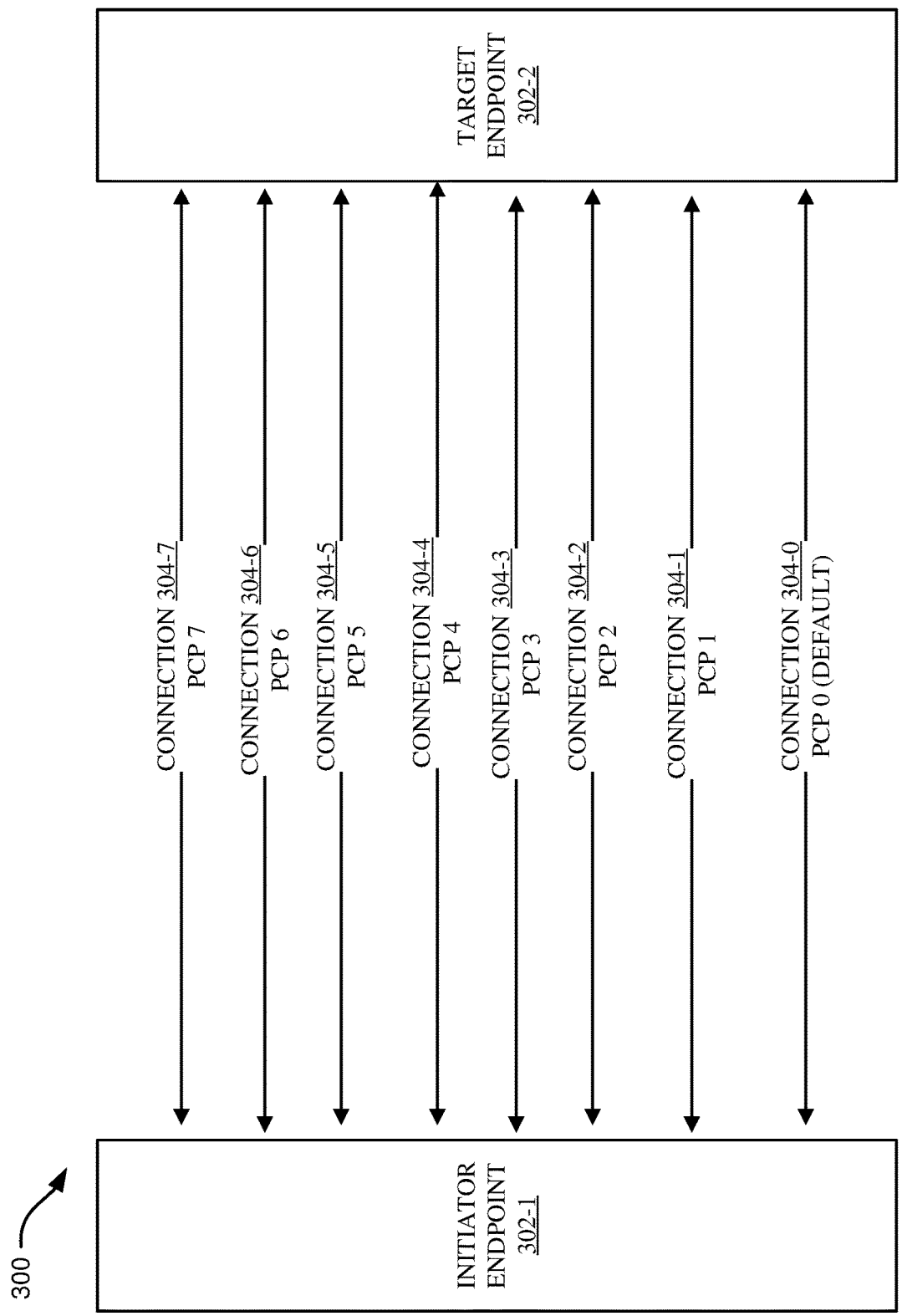
FIG. 3 illustrates a block diagram of a system utilizing priority-based connections between two endpoints, in accordance with some embodiments of the present disclosure.

FIG. 3 illustrates a block diagram of a system 300 utilizing priority-based connections between two endpoints, in accordance with some embodiments of the present disclosure. Initiator endpoint 302-1 and target endpoint 302-2 can be any computational system such as, but not limited to, servers, desktops, laptops, tablets, smartphones, and/or other electronic devices utilizing physical and/or virtualized hardware to implement software. Initiator endpoint 302-1 and target endpoint 302-2 can execute, applications (e.g., application 102), virtual machines (e.g., VM 202-2), and/or containers (e.g., container 202-1, container 202-3). Initiator endpoint 302-1 and target endpoint 302-2 can communicate via a plurality of connections 304, where each respective connection 304 of the plurality of connections 304 is dedicated to a particular priority classification. In some embodiments, the plurality of connections 304 are network connections realized by an Ethernet Fabric.

As shown in FIG. 3, and as previously discussed in FIGS. 1-2, priority classifications can range from 0 (e.g., a default priority, a lowest priority, a null priority, etc.) to 7 (e.g., a critical priority, a highest priority, etc.). However, in other embodiments, more or fewer categories of priority can be utilized. Further, in other embodiments, different types of priorities can be classified using alternative notations including numeric, alphanumeric, alphabetical, and/or symbolic notations.

As shown in FIG. 3, the plurality of connections 304 can include a first connection 304-1 for IO requests associated with a priority of 1, a second connection 304-2 for IO requests associated with a priority of 2, a third connection 304-3 for IO requests associated with a priority of 3, a fourth connection 304-4 for IO requests associated with a priority of 4, a fifth connection 304-5 for IO requests associated with a priority of 5, a sixth connection 304-6 for IO requests associated with a priority of 6, a seventh connection 304-7 for IO requests associated with a priority of 7, and a default connection 304-0 for IO requests associated with a priority of 0 or other default (e.g., null) value.

Advantageously, aspects of the present disclosure transmit IO requests between the initiator endpoint 302-1 and the target endpoint 302-2 using a connection 304 that is dedicated to a particular priority classification associated with the IO request. In this way, aspects of the present disclosure can preserve bandwidth of critical IO requests by having a dedicated connection 304 for communicating those critical IO requests. Meanwhile, if there is an influx of relatively less important IO requests (e.g., IO requests that can be delayed due to network congestion without adverse performance effects on an application, container, or VM), those relatively less important IO requests can be relegated to a dedicated connection 304 which prevents the influx of relatively less important IO requests from interfering with the serving of relatively more important (e.g., higher priority) IO requests. In other words, aspects of the present disclosure enable transmitting data with different priority levels between the same two endpoints, thereby reducing the risk of network congestion adversely impacting data transmissions that are of relatively higher importance, critical importance, and the like.

In some embodiments, the target endpoint 302-2 responds to any IO request received from the initiator endpoint 302-1 using a same connection 304 (and therefore same priority value) as the connection 304 used to transmit the IO request from the initiator endpoint 302-1 to the target endpoint 302-2. In this way, the priority classification of a response can be the same priority classification as the original request that caused the response-thereby realizing the same improvements in network congestion as discussed above with regard to the original transmission from the initiator endpoint 302-1 to the target endpoint 302-2.

Figure 4:
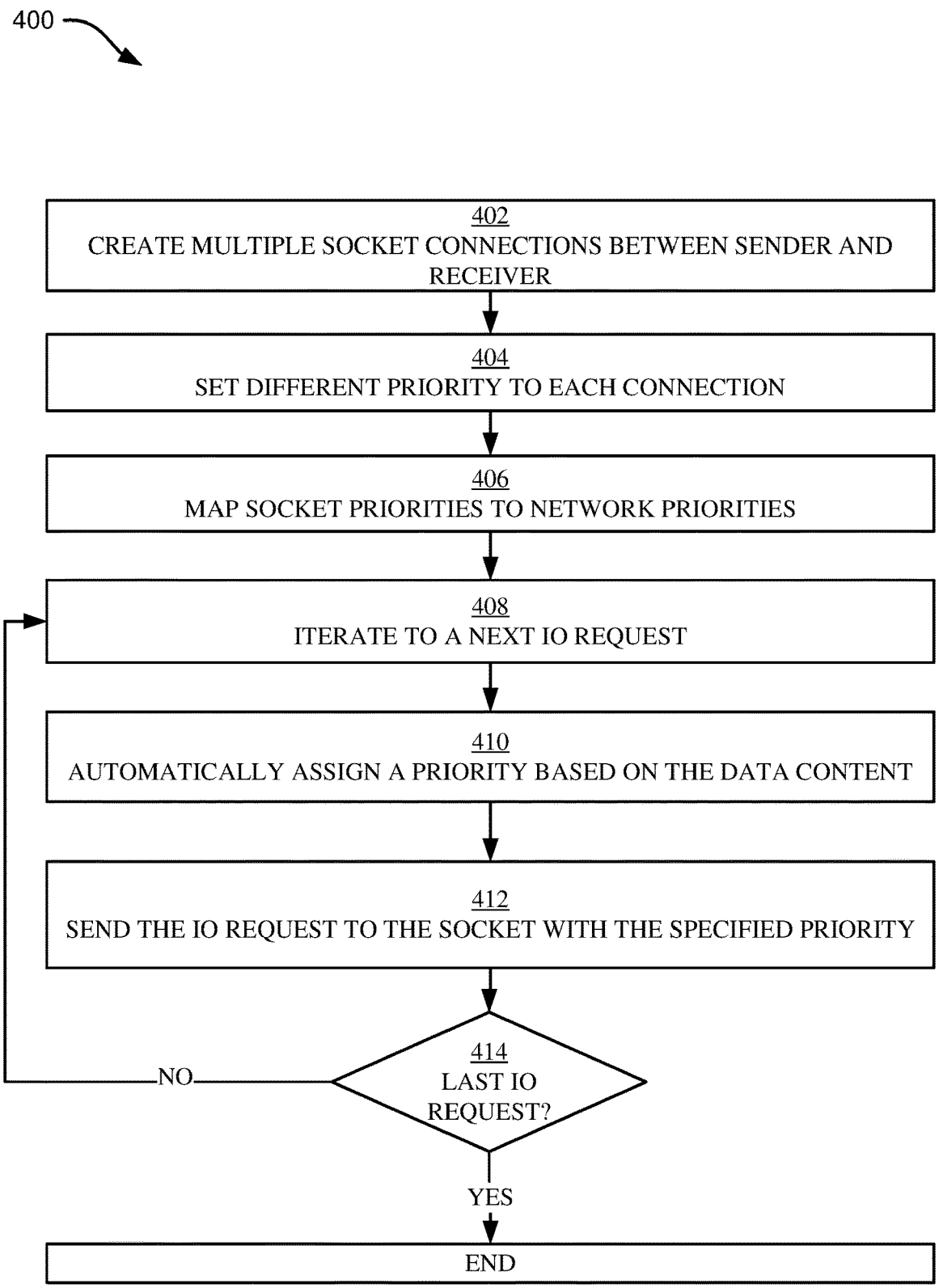
FIG. 4 illustrates a flowchart of an example method for implementing dynamic data prioritization for network traffic at an initiator endpoint, in accordance with some embodiments of the present disclosure.

FIG. 4 illustrates a flowchart of an example method 400 for implementing dynamic data prioritization for network traffic at an initiator endpoint, in accordance with some embodiments of the present disclosure. The method 400 can be implemented by an initiator endpoint 302-1, an application 102, a container, a virtual machine, a computer, a processor, or another configuration of hardware and/or software.

Operation 402 includes creating multiple socket connections between a sender (e.g., initiator endpoint 302-1) and a receiver (e.g., target endpoint 302-2). The socket connections can be established in a session managed by an iSCSI/iSER/NVMeF layer. For example, for iSER connectivity between two endpoints, eight RDMA connections can be established between the two endpoints.

Operation 404 includes setting different priorities for each connection. For example, the priorities can range from 0 (e.g., a default priority, a lowest priority, a null priority, etc.) to 7 (e.g., a highest priority, a critical priority, etc.). In some embodiments, Application Programming Interfaces (APIs) are used, such as kernel driver APIs, user driver APIs, or other APIs, to set the different socket priorities. In some embodiments, operation 404 includes defining the different priorities for each connection at both the sender (e.g., initiator endpoint 302-1) and the receiver (e.g., target endpoint 302-2).

Operation 406 includes mapping socket priorities to network priorities. In some embodiments, operation 406 utilizes a Linux "ip" command, a Linux "ipconfig" command, or another command to map socket priorities to network priorities. In some embodiments, operation 406 utilizes a database to map socket priorities defined by the sender and/or receiver to network priorities defined by a network connecting the sender and the receiver. As one example, operation 406 can include mapping socket priorities to Ethernet frame priorities (e.g., as defined by IEEE 802.1Qbb). As another example, operation 406 can include mapping socket priorities to a Type of Service (ToS) field in a packet header (e.g., the second byte in Internet Protocol Version Four (IPv4) headers, a Traffic Class in IPv6 headers, etc.). As yet another example, operation 406 can include mapping socket priorities to Differentiated Services Code Points (DSCP) in IPv4 packet headers. Any number of other vendor-specific, open-source, standardized, or other network prioritization schema, now known or later developed, is within the spirit and scope of the present disclosure.

Operation 408 includes iterating to a first (or next) IO request that is generated by the sender (e.g., initiator endpoint 302-1). Operation 410 includes automatically assigning a priority to the IO request based on data content of the IO request. For example, confidential files can be assigned a highest priority while publicly downloaded files can be assigned a lowest priority. As another example, video files can have higher priorities than text files. The rules defining priority assignments can be manually configured or automatically generated (e.g., using a machine learning model, a deep learning model, artificial intelligence, and the like).

Operation 412 includes sending the IO request to the socket with the specified priority for transmission to the receiver (e.g., target endpoint 302-2). In some embodiments, operation 412 includes sending the IO request with the defined priority to a transport layer (e.g., an iSCSI/iSER/NVMeF layer) through one or more intermediate layers. In some embodiments, operation 412 involves modifying APIs used for communicating between different layers (e.g., layers between an application 102 and an iSCSI/iSER/NVMeF layer 114, or layers between a container 202-1 or VM 202-2 and an iSCSI/iSER/NVMeF layer 214).

Operation 414 includes determining if the IO request sent in operation 412 was the last IO request. If not (414: NO), then the method 400 returns to operation 408 and iterates to a next IO request. If so (414: YES), then the method 400 ends.

Figure 5:
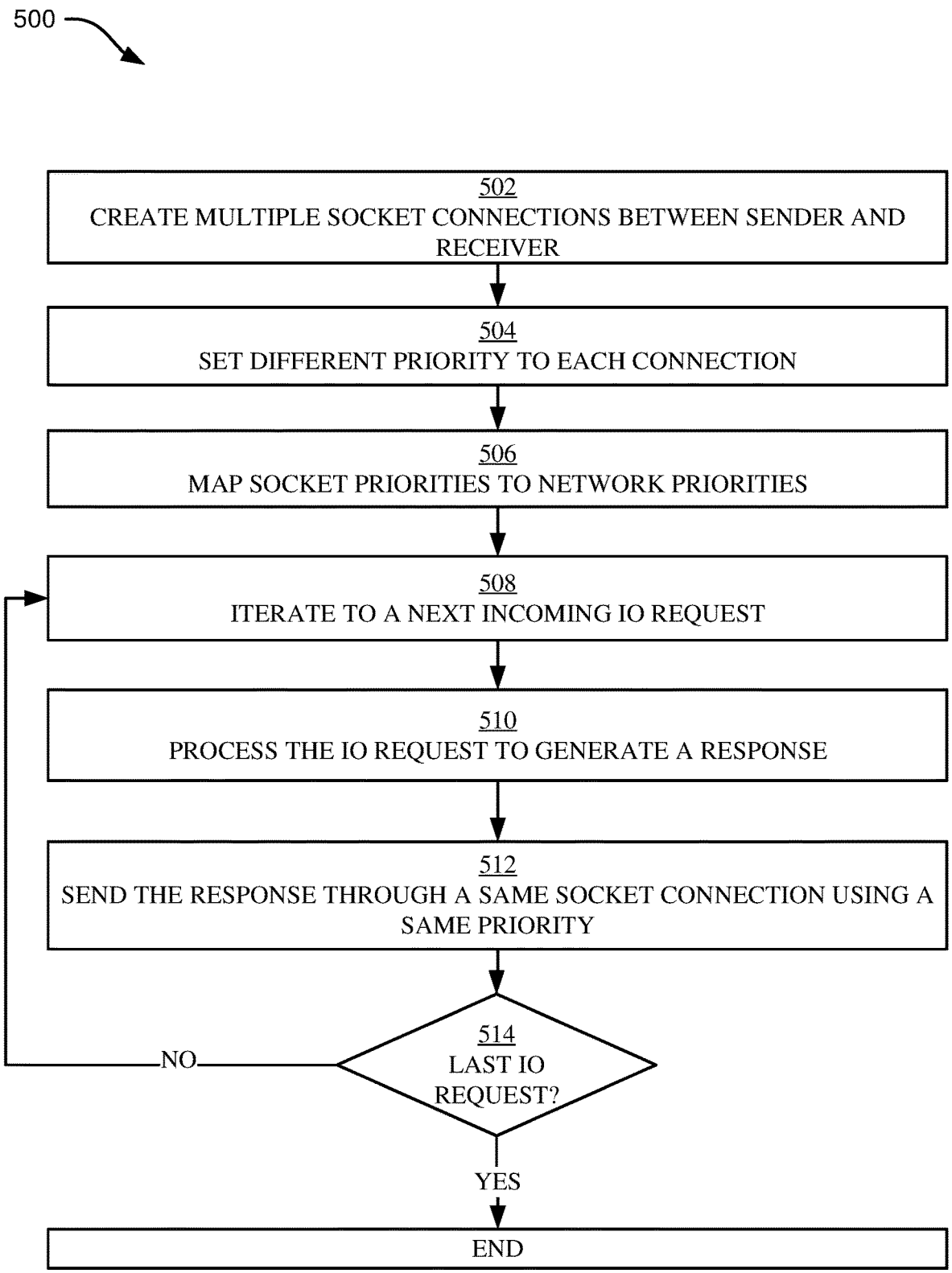
FIG. 5 illustrates a flowchart of an example method for implementing dynamic data prioritization for network traffic at a target endpoint, in accordance with some embodiments of the present disclosure.

FIG. 5 illustrates a flowchart of an example method 500 for implementing dynamic data prioritization for network traffic at a target endpoint, in accordance with some embodiments of the present disclosure. The method 500 can be implemented by a target endpoint 302-2, an application 102, a container, a virtual machine, a computer, a processor, or another configuration of hardware and/or software.

Operation 502 includes creating multiple socket connections between a sender (e.g., initiator endpoint 302-1) and a receiver (e.g., target endpoint 302-2). The socket connections can be established in a session managed by an iSCSI/iSER/NVMeF layer. As one example, for iSER connectivity between two endpoints, eight RDMA connections can be established between the two endpoints.

Operation 504 includes setting different priorities for each connection. For example, the priorities can range from 0 (e.g., a default priority, a lowest priority, a null priority, etc.) to 7 (e.g., a highest priority, a critical priority, etc.). In some embodiments, APIs, such as kernel driver APIs, user driver APIs, or other APIs, are used to set the different socket priorities. In some embodiments, operation 504 includes defining the different priorities for each connection at both the sender (e.g., initiator endpoint 302-1) and the receiver (e.g., target endpoint 302-2).

Operation 506 includes mapping socket priorities to network priorities. In some embodiments, operation 506 utilizes a database to map socket priorities defined by the sender and/or receiver to network priorities defined by a network connecting the sender and the receiver. Operation 506 can be performed similarly to operation 406 of FIG. 4.

Operation 508 includes iterating to a first (or next) IO request that is received from the sender (e.g., the initiator endpoint 302-1). Operation 510 includes processing the IO request to generate a response. Operation 512 includes sending the generated response back to the sender (e.g., the initiator endpoint 302-1) using a same socket (and thereby a same priority) as the IO request that is associated with the response.

Operation 514 includes determining if the IO request associated with the response sent in operation 512 was the last IO request. If not (514: NO), then the method 500 returns to operation 508 and iterates to a next IO request. If so (514: YES), then the method 500 ends.

Figure 6:
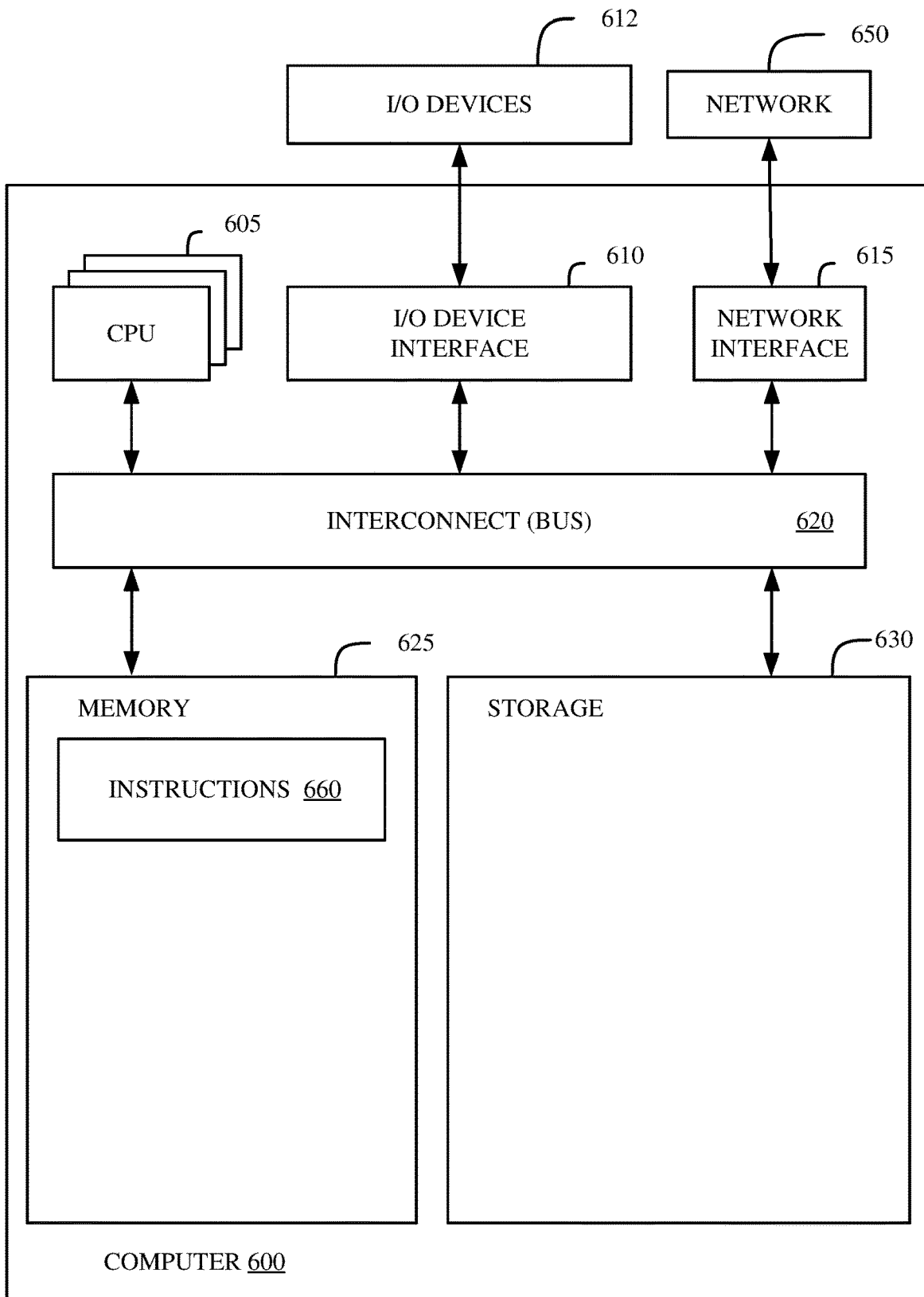
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all portions of the methods described in FIGS. 4-5 and/or implement the functionality discussed in FIGS. 1-3. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) one or more entities illustrated in FIGS. 1-3 and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIGS. 4-5 and/or implement the functionality discussed in FIGS. 1-3. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
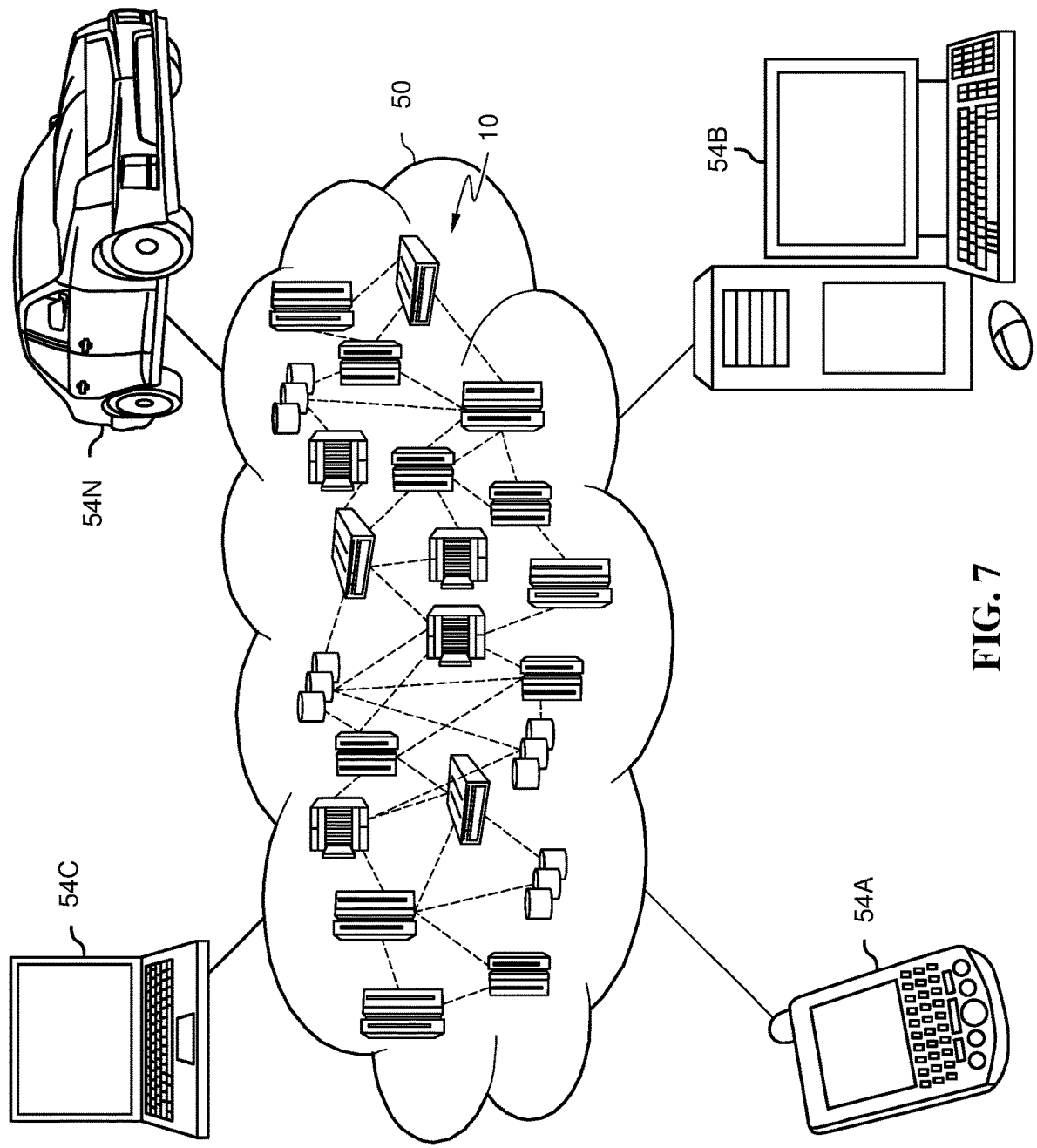
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
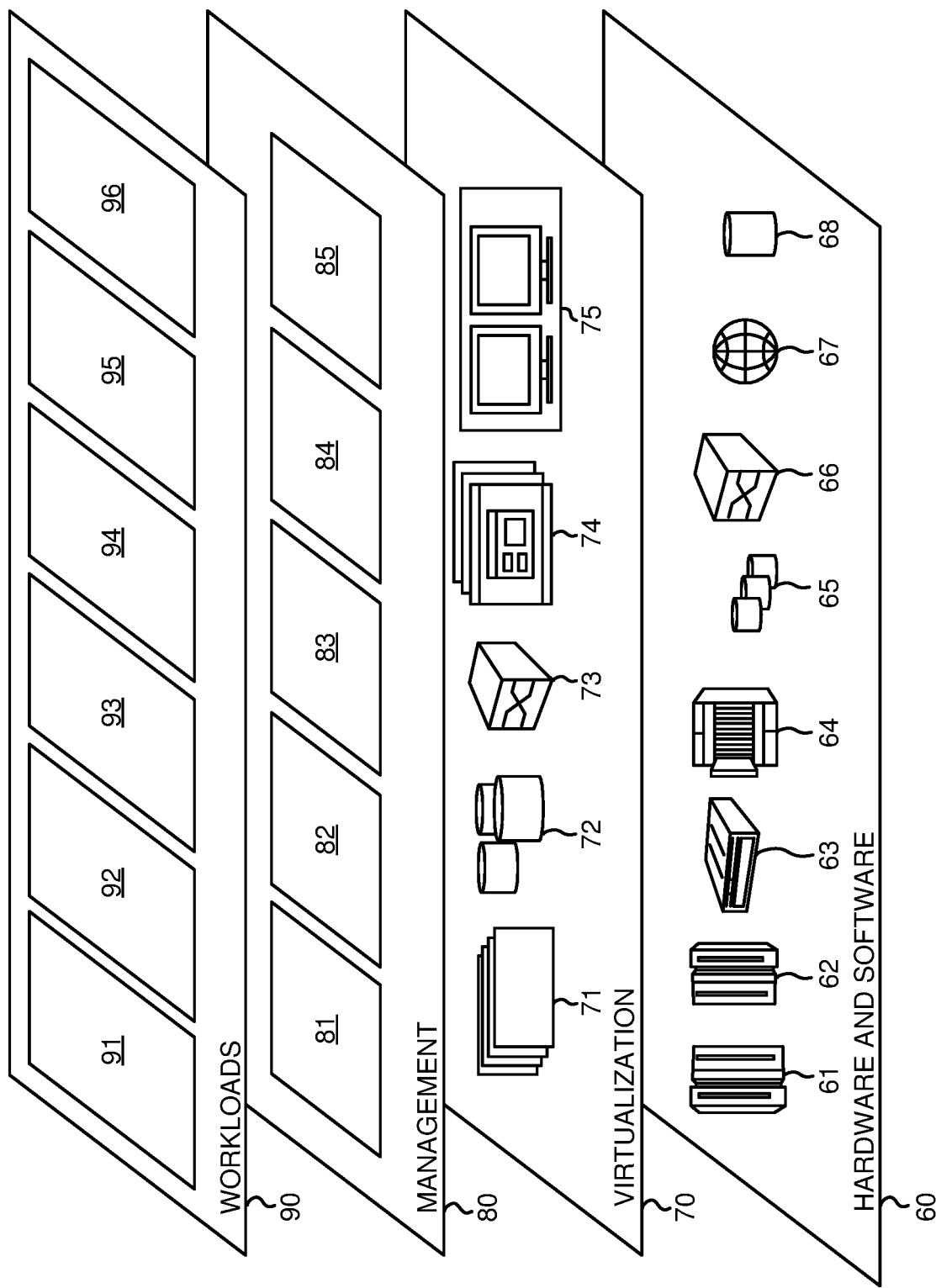
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic data prioritization using various session sockets 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 4-5 and/or implement the functionality discussed in FIGS. 1-3 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes defining a respective priority classification for each of a plurality of sockets used for communicating between an initiator computational system and a target computational system; automatically assigning a respective priority classification to each of a plurality of Input/Output (IO) requests based on a type of data associated with each IO request; and sending the plurality of IO requests to respective sockets of the plurality of sockets with a matching priority classification.

Example 2 includes the method of example 1, including or excluding optional features. In this example, each of the plurality of sockets is associated with one and only one priority classification.

Example 3 includes the method of any one of examples 1 to 2, including or excluding optional features. In this example, the plurality of sockets is associated with an Internet Small Computer Systems Interface (iSCSI) layer.

Example 4 includes the method of any one of examples 1 to 3, including or excluding optional features. In this example, the plurality of sockets is associated with an Internet Small Computer Systems Interface (iSCSI) Extensions over Remote Direct Memory Access (RDMA) (iSER) layer.

Example 5 includes the method of any one of examples 1 to 4, including or excluding optional features. In this example, the plurality of sockets is associated with a Non-Volatile Memory Express Over Fabric (NVMeF) layer.

Example 6 includes the method of any one of examples 1 to 5, including or excluding optional features. In this example, the plurality of IO requests is generated, at least in part, by an application implemented at least partially on the initiator computational system.

Example 7 includes the method of any one of examples 1 to 6, including or excluding optional features. In this example, the plurality of IO requests is generated, at least in part, by a virtual machine implemented at least partially on the initiator computational system.

Example 8 includes the method of any one of examples 1 to 7, including or excluding optional features. In this example, the plurality of IO requests is generated, at least in part, by a container implemented at least partially on the initiator computational system.

Example 9 includes the method of any one of examples 1 to 8, including or excluding optional features. In this example, sending the plurality of IO requests includes sending a first IO request to the target computational system using a first socket of the plurality of sockets, wherein the first IO request and the first socket each have a same priority classification, and wherein the method further comprises: receiving, from the first socket, a response from the target computational system to the first IO request.

Example 10 includes the method of any one of examples 1 to 9, including or excluding optional features. In this example, the method further comprises: mapping each respective priority classification for each of the plurality of sockets to a network priority classification. Optionally, the network priority classification comprises Priority Code Points (PCP) of Priority Flow Control (PFC) for Ethernet.

Example 11 includes the method of any one of examples 1 to 10, including or excluding optional features. In this example, the method further comprises: receiving, at a same socket that sent one of the plurality of IO requests, a response to the one of the plurality of IO requests.

Example 12 is a system. The system includes one or more processors and one or more computer-readable storage media storing program instructions which, when executed by the one or more processors, are configured to cause the one or more processors to perform a method according to any one of examples 1 to 11.

Example 13 is a computer program product. The computer program product includes one or more computer readable storage media, and program instructions collectively stored on the one or more computer readable storage media, the program instructions comprising instructions configured to cause one or more processors to perform a method according to any one of examples 1 to 11.

What is claimed is:

1. A computer-implemented method comprising:
   defining a respective priority classification for each of a plurality of sockets used for communicating between an initiator computational system and a target computational system;
   mapping, using a database, each respective priority classification for each of the plurality of sockets to a single network priority classification;
   automatically assigning a respective priority classification to each of a plurality of Input/Output (IO) requests based on a type of data and a content of the data associated with each IO request; and
   sending the plurality of IO requests to respective sockets of the plurality of sockets with a matching priority classification.

2. The method of claim 1, wherein each of the plurality of sockets is associated with one and only one priority classification.

3. The method of claim 1, wherein the plurality of sockets is associated with an Internet Small Computer Systems Interface (iSCSI) layer.

4. The method of claim 1, wherein the plurality of sockets is associated with an Internet Small Computer Systems Interface (iSCSI) Extensions over Remote Direct Memory Access (RDMA) (iSER) layer.

5. The method of claim 1, wherein the plurality of sockets is associated with a Non-Volatile Memory Express Over Fabric (NVMeF) layer.

6. The method of claim 1, wherein the plurality of IO requests is generated, at least in part, by an application implemented at least partially on the initiator computational system.

7. The method of claim 1, wherein the plurality of IO requests is generated, at least in part, by a virtual machine implemented at least partially on the initiator computational system.

8. The method of claim 1, wherein the plurality of IO requests is generated, at least in part, by a container implemented at least partially on the initiator computational system.

9. The method of claim 1, wherein sending the plurality of IO requests includes sending a first IO request to the target computational system using a first socket of the plurality of sockets, wherein the first IO request and the first socket each have a same priority classification, and wherein the method further comprises:
   receiving, from the first socket, a response from the target computational system to the first IO request.

10. The method of claim 1, wherein the single network priority classification comprises Priority Code Points (PCP) of Priority Flow Control (PFC) for Ethernet wherein the plurality of sockets comprises eight sockets, and wherein each socket is associated with one and only one of eight standard PCP values in PFC for Ethernet.

11. The method of claim 1, wherein the method further comprises:
   receiving, at a same socket that sent one of the plurality of IO requests, a response to the one of the plurality of IO requests.

12. The method of claim 1, wherein the single network priority classification comprises a Type of Service (Tos) field in a packet header, wherein the ToS field is a second byte in Internet Protocol Version Four (IPv4) packet headers.

13. The method of claim 1, wherein the single network priority classification comprises a Differentiated Services Code Points (DSCP) in an Internet Protocol Version Four (IPv4) packet header.

14. The method of claim 1, wherein the single network priority classification comprises a Type of Service (Tos) field in a packet header, wherein the ToS field is a Traffic Class in Internet Protocol Version Six (IPv6) packet headers.

15. The method of claim 1, wherein the automatically assigning the respective priority classification to each of the plurality of IO requests is performed using a machine learning model.

16. A system comprising:
   one or more computer readable storage media storing program instructions; and
   one or more processors which, in response to executing the program instructions, are configured to perform a method comprising:
   defining a respective priority classification for each of a plurality of sockets used for communicating between an initiator computational system and a target computational system;
   mapping, using a database, each respective priority classification for each of the plurality of sockets to a single network priority classification;
   automatically assigning a respective priority classification to each of a plurality of Input/Output (IO) requests based on a type of data and a content of the data associated with each IO request; and
   sending the plurality of IO requests to respective sockets of the plurality of sockets with a matching priority classification.

17. The system of claim 16, wherein sending the plurality of IO requests includes sending a first IO request to the target computational system using a first socket of the plurality of sockets, wherein the first IO request and the first socket each have a same priority classification, and wherein the method further comprises:
   receiving, from the first socket, a response from the target computational system to the first IO request.

18. The system of claim 16, wherein the single network priority classification comprises Priority Code Points (PCP) of Priority Flow Control (PFC) for Ethernet wherein the plurality of sockets comprises eight sockets, and wherein each socket is associated with one and only one of eight standard PCP values in PFC for Ethernet.

19. A computer program product comprising one or more computer readable storage media, and program instructions collectively stored on the one or more computer readable storage media, the program instructions comprising instructions configured to cause one or more processors to perform a method comprising:
   defining a respective priority classification for each of a plurality of sockets used for communicating between an initiator computational system and a target computational system;
   mapping, using a database, each respective priority classification for each of the plurality of sockets to a single network priority classification;
   automatically assigning a respective priority classification to each of a plurality of Input/Output (IO) requests based on a type of data and a content of the data associated with each IO request; and
   sending the plurality of IO requests to respective sockets of the plurality of sockets with a matching priority classification.

20. The computer program product of claim 19, wherein the single network priority classification comprises Priority Code Points (PCP) of Priority Flow Control (PFC) for Ethernet, wherein the plurality of sockets comprises eight sockets, and wherein each socket is associated with one and only one of eight standard PCP values in PFC for Ethernet.

* * * * *